Figure 1:
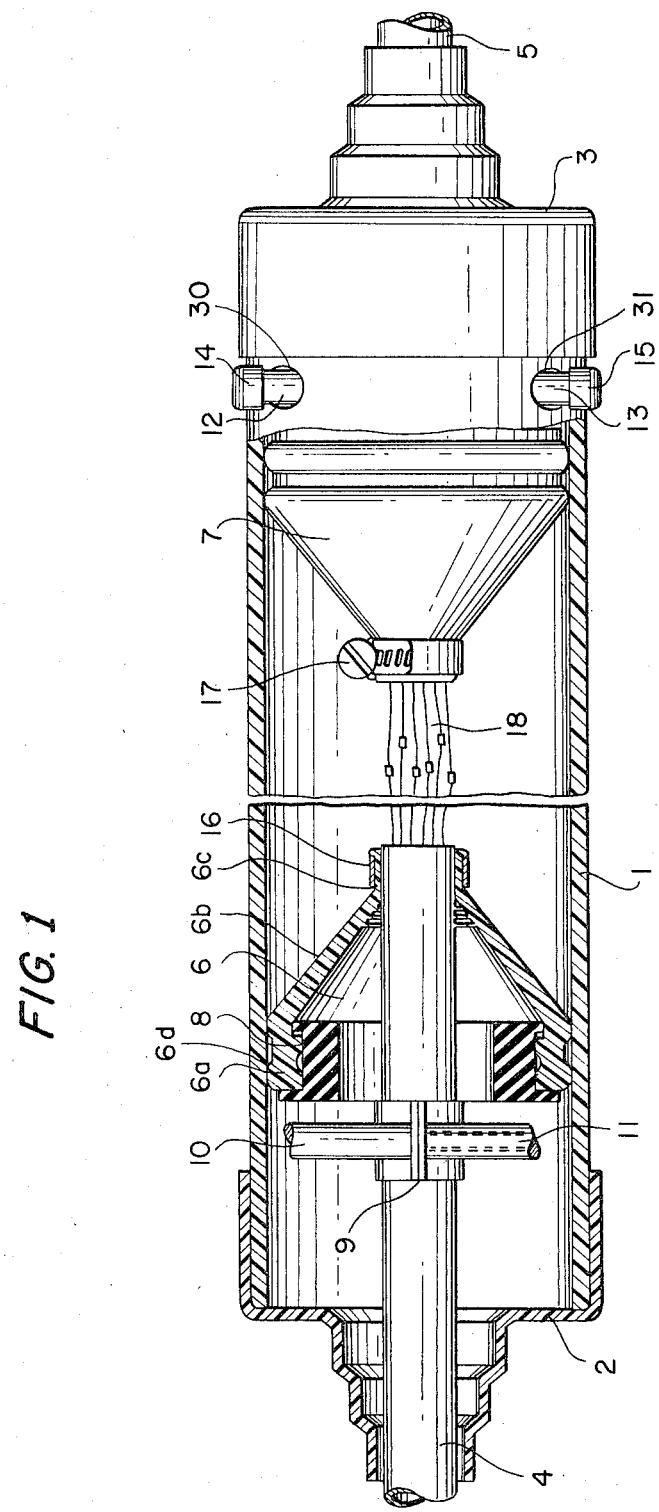

United States Patent [19]
Jirka

[11] 3,818,124
[45] June 18, 1974

[54] CABLE CONNECTOR BOX
[75] Inventor: Karl Jirka, Munich, Germany
[73] Assignee: Kunststoffwerke Gebrueder Anger GmbH & Co., Munich, Germany
[22] Filed: June 23, 1972
[21] Appl. No.: 265,641

[30] Foreign Application Priority Data
June 25, 1971 Germany............................ 2131686

[52] U.S. Cl.................. 174/93, 174/91, 339/213 R
[51] Int. Cl............................................ H02g 15/08
[58] Field of Search............................. 174/91–93, 174/76, 77 R, 138 F, 88 R, 21 R; 339/201, 208, 213 R

[56] References Cited
UNITED STATES PATENTS
3,054,847  9/1962  Colbert............................ 174/93 X
3,705,950  12/1972  Jirka et al........................ 174/93 X

*Primary Examiner*—Darrell L. Clay
*Attorney, Agent, or Firm*—Edmund M. Jaskiewicz

[57] ABSTRACT

A sealed connector box for spliced electrical cables comprises a tubular central element interconnecting a pair of end elements to define a closed chamber within which electrical cable ends are inserted through small diameter end openings of the end elements and are spliced within the chamber. A conical sealing element is slid over each end of the electrical cable on both sides of a splice and each sealing element has an outer end which sealingly engages the inner face of the tubular central element. A ring has a peripheral surface supporting the inner face of the outer sealing end of each sealing element. The outer end sealing surface of each sealing element may comprise one or more corrugations which closely engage the inner face of the tubular central element. A bolt interconnects the tubular element to clamps positioned on each cable end between the supporting ring and end element so as to securely couple the tubular central element to the cable ends.

5 Claims, 2 Drawing Figures

CABLE CONNECTOR BOX

The present invention relates to a sealed connector box for electrical cables, more particularly, to a sealed connector box wherein a tubular element interconnects two end elements through which the ends of the cables to be spliced are inserted, the connector box may be made completely or partially of a synthetic plastic material.

Various forms of sealed connector boxes for connecting electrical cables in straight line joints have been proposed. Such connector boxes usually consist of lead, aluminum or steel as well as compounds of molded resin or other synthetic plastic materials. Essentially, each connector box comprises a tubular element as the central component with the ends of the tubular element being closed by end elements having small diameter openings through which the cables to be connected are inserted. It has also been proposed to fabricate the central component of two parts. Further, the end elements through which the cables are introduced may be constructed as separate parts. When the connector box is fabricated of metal the components are usually connected together by soldering, welding or the like or by a detachable connection which may comprise various forms of coupling elements such as conical rings or the like which sealingly connect the components to each other. When the connector boxes have components of plastic materials the components may be molded or bonded to each other or adhered to each other in some other manner as known in the synthetic materials art. Those types of connections or joints in the connector boxes that require time and skill at the building site in order to complete contribute to making this type of connector box relatively expensive. Further, the joints produced by casting, bonding, welding or soldering are relatively permanent and the connector box is generally not reuseable after these bonds have been opened. Where the bonds have been opened this is usually accomplished by a great deal of labor and necessitates the replacement of the entire connector box.

In those connector boxes where the components are coupled by threads the problem is always presented of obtaining a tight connection at this threaded joint. Further, the connector boxes incorporating threaded joints are relatively expensive to manufacture.

It is therefore the principal object of the present invention to provide a novel and improved connector box for electrical cables.

It is another object of the present invention to provide a connector box for a straight-line connection of electrical cables which consists entirely or partially of synthetic plastic materials.

It is an additional object of the present invention to provide a connector box for electrical cables which is simple in construction and assembly and can be readily connected at the building site with a minimum of effort.

The objects of the present invention are obtained and the disadvantages of the prior art as described above are overcome by the sealed connector box disclosed as the present invention. The connector box disclosed herein essentially comprises a pair of end elements each having a small diameter end opening through which an electrical cable may be inserted and a large diameter end opening. A tubular central element interconnects the large diameter ends of the end elements to define a closed chamber within which the electrical cable ends to be inserted through the small diameter end openings of the end elements may be spliced. A conical sealing element is slid over each end of the electrical cables on both sides of a splice. Each sealing element has an outer end which sealingly engages the inner face of the tubular central element. A ring supports the inner face of the outer sealing end of each sealing element.

The outer face of the sealing end of the sealing element may be provided with a plurality of corrugations while the inner face of the sealing end may have a configuration conforming to the peripheral surface of the supporting ring. A bolt securely couples the tubular central element and the cable ends by being attached to the tubular central element and cable clamps located on the cable ends.

Figure 2:
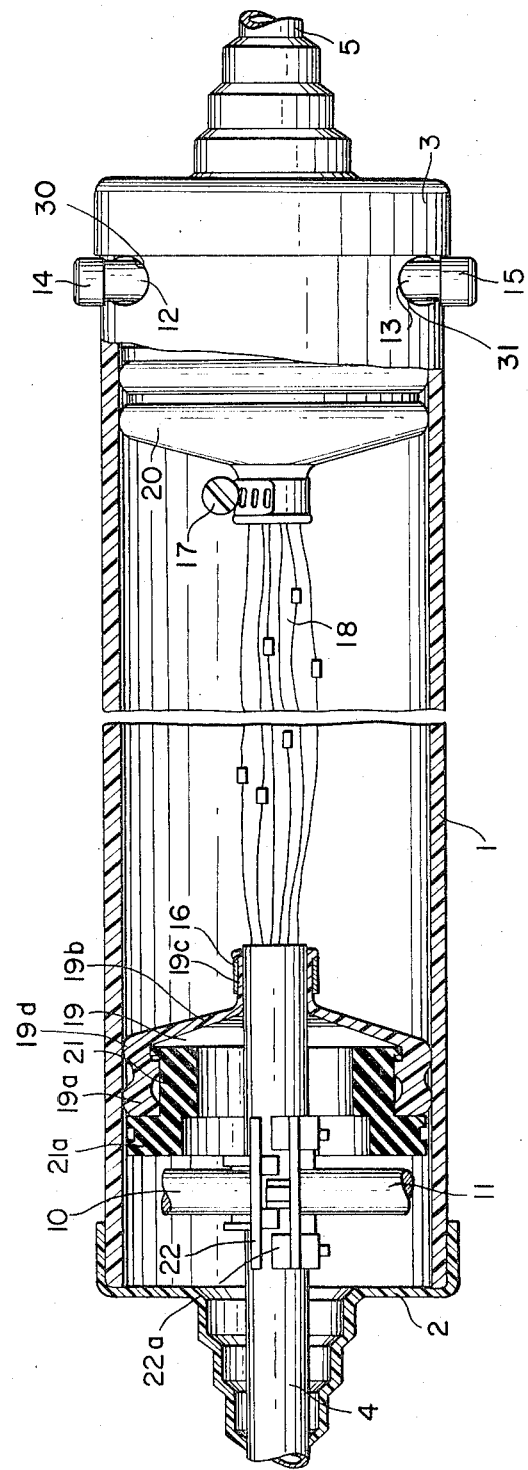

Other objects and advantages of the present invention will be apparent upon reference to the accompanying description when taken in conjunction with the following drawings, which are exemplary, wherein;

FIG. 1 is a longitudinal sectional view through a portion of the sealed connector box of the present invention; and FIG. 2 is a view similar to that of FIG. 1 but of a modification.

Proceeding next to the drawings wherein like reference symbols indicate the same parts throughout the various views a specific embodiment and a modification of the present invention will be described in detail.

Referring to FIG. 1, the connector box illustrated therein comprises a tubular central element 1 closed at both ends by end elements 2 and 3 through which cable ends 4 and 5 are inserted and whose ends are to be spliced. The end elements 2 and 3 each have a large diameter opening which is mounted upon an end of the central element 1 and a small diameter opening which fits closely around the sheath of the electric cable which is led into the connector box. The connecting of the end elements 2 and 3 on both ends of the central element 1 defines a closed chamber within which the ends of the cables 4 and 5 are spliced.

Conical or funnel-shaped sealing elements 6 and 7 are slid over the cable ends 4 and 5 respectively. Each sealing element has a tapering portion 6b which is preferably wedge-shaped in cross-section as may be seen in FIG. 1. The conical portion 6b tapers outwardly to form a sealing end 6a which may be provided with one or more corrugations 6d positioned in sealing engagement with the inner face of the central element 1. The sealing surface is at the area of maximum diameter of the sealing element. At the other end of the conical portion 6b is a smaller diameter opening 6c that is slid over the sheath of electrical cable 4 and may be additionally provided with lips or grooves on its inner surface to provide a tight seal.

The sealing element 6 is secured in position by means of a supporting ring 8 whose peripheral surface engages the inner face of the sealing element. Because of the corrugations or bulges 6d on the outer surface of the sealing end of the sealing element a sealing effect with respect to the tubular central element 1 is achieved, even in those situations where the connector box is subjected to bending stresses.

A cable clamp 9 is mounted on the electrical cable 4 between supporting ring 8 and the cable end element 2. This clamp is employed to provide a secure coupling between cable 4 and the tubular central element 1. This coupling is achieved by threaded staybolts that are screwed into threaded sleeves 10 and 11 and through openings such as 30 and 31 in the central element 1. In a similar manner a cable clamp is provided on the cable 5 and a staybolt screwed into threaded sleeves 12 and 13. The ends of the sleeves 12 and 13 may be closed by protective caps 14 and 15.

In order to simplify the assembly procedure the threaded sleeves 10, 11 or 12, 13 may be split so that tightening may be easily achieved by use of a simple tool such as a screw driver.

The cable opening 6c of sealing element 6, and similarly the cable opening of sealing element 7 may both be tightly positioned on their respective cables 4 and 5 by cable clamps 16 and 17. The splice between the cables 4 and 5 wherein the individual conductors of each cable are connected is indicated at 18.

In the modification of FIG. 2 more space is provided for a splice in the interior of the connector box by making the sealing elements shorter in axial length. In this modification funnel-shaped sealing elements 19 and 20 are provided. Sealing element 19 has a small diameter end 19c which is slid over the cable 4 and has a conical portion 19b which terminates in a large diameter portion 19a whose outer face is sealingly engaged against the inner face of the tubular central element 1 and which may be provided with one or more bulges or corrugations 19d. The conical or connecting portion 19b rises at a much deeper angle than the corresponding component 6b of the embodiment of FIG. 1.

The sealing element 19 of FIG. 2 is supported upon a ring 21 which has a larger diameter portion 21a which is spaced from the inner face of tubular element 1 by only a very small clearance.

The modification of FIG. 2 is provided with a cable clamp that can be simultaneously employed for cables of different diameters. This cable clamp has parts 22 and 22a that engage each other and are clamped together in a similar manner by a threaded staybolt passing through sleeves 10 and 11.

All of the components of the connector boxes described above may be formed of a thermoplastic synthetic resin material while the sealing elements 6, 7 and 19, 20 may comprise rubber or a synthetic resin. The cable clamps can be made from metal in a manner known in the art.

The assemble of these connector boxes is considerably facilitated by the arrangement of the conical sealing elements 6, 7 or 19, 20 which slide over the cable ends 4 and 5 with their smaller diameter openings pointing towards the splice. No auxiliary tools are required for mounting the sealing elements over the cable ends or for assembling these connector boxes. The entire arrangement of the connector box is force locking in a longitudinal direction and is secure in regard to both tensile and compressive stresses. Further, the connector box is sealed tight against even the appearance of any bending stresses which may occur in the box. Torsional forces which may occur do not have any effect on the strength and tightness of the seal of the connector box.

It is understood that this invention is susceptible to modification in order to adapt it to different usages and conditions and, accordingly, it is desired to comprehend such modifications within the invention as may fall within the scope of the appended claims.

What is claimed is:

1. A sealed splice of electrical cables comprising a pair of end elements each having a small diameter end opening through which an electrical cable is inserted and a large diameter end opening, a tubular central element interconnecting the large diameter ends of said end elements defining a closed chamber within which the electrical cable ends are spliced, a conical sealing element slid over each end of the electrical cable on each side of said splice, said sealing elements each having an outer end sealingly engaging the inner face of said tubular central element, and a ring supporting the inner face of the outer sealing end of each sealing element.

2. A sealed splice as claimed in claim 1 wherein the outer end sealing surface of each sealing element has at least one corrugation thereof, the inner face of the outer end sealing surface having a configuration conforming to the peripheral surface of said supporting ring.

3. A sealed splice as claimed in claim 1 wherein said supporting ring has a larger diameter portion proximate the inner face of said tubular central element.

4. A sealed splice as claimed in claim 1 including a cable clamp on each cable end between the respective end element and supporting ring, and a threaded bolt interconnecting each said clamp and tubular element to securely couple said tubular element and said cable ends.

5. A sealed splice as claimed in claim 1 wherein one or more of said end elements, said tubular central element, said sealing elements, and said supporting rings are formed of a synthetic plastic material.

* * * * *